Figure 1:
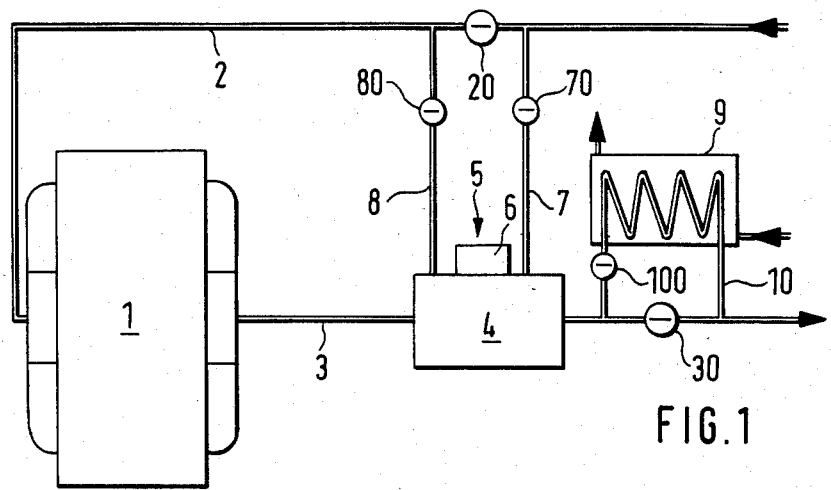

United States Patent [19]

Melzer

[11] Patent Number: 4,506,505
[45] Date of Patent: Mar. 26, 1985

[54] DIESEL INTERNAL COMBUSTION ENGINE WITH SOOT BURN-OFF DEVICE

[75] Inventor: Hans-Harald Melzer, Neufahrn, Fed. Rep. of Germany

[73] Assignee: Bayerische Motoren Werke A.G., Fed. Rep. of Germany

[21] Appl. No.: 438,985

[22] Filed: Nov. 4, 1982

[30] Foreign Application Priority Data

Nov. 7, 1981 [DE] Fed. Rep. of Germany ....... 3144349

[51] Int. Cl.³ ............................................... F01N 3/02
[52] U.S. Cl. ........................................ 60/278; 60/311;
  60/320; 123/142.5 R; 123/179 H; 123/196 AB;
  123/550; 123/569
[58] Field of Search .......................... 60/278, 311, 320;
  123/569, 179 H, 142.5 R, 196 AB, 550

[56] References Cited

U.S. PATENT DOCUMENTS

| | | | |
|---|---|---|---|
| 3,732,696 | 5/1973 | Masaki | 123/142.5 R |
| 4,258,676 | 3/1981 | Lamm | 123/142.5 R |
| 4,381,643 | 5/1983 | Stark | 60/296 |
| 4,391,235 | 7/1983 | Majkrzak | 123/142.5 R |

*Primary Examiner*—Douglas Hart
*Attorney, Agent, or Firm*—Craig and Burns

[57] ABSTRACT

A diesel internal combustion engine with a soot filter in the exhaust system is equipped with a controllable soot burn-off device. The latter comprises a burner arranged in the soot filter and is operable with fresh air separately fed to the soot filter.

In order to render the soot burn-off device useful for several purposes, this device is switchable to serve as a warm-up means which heats up the engine and or its running and operating media during or before operation.

3 Claims, 7 Drawing Figures

| SWITCH<br>CONTROL ELEMENT | N | A | H | B | E |
|---|---|---|---|---|---|
| 20 | F | B | F | F | F |
| 30 | F | F | B | B | B |
| 70 | B | F | F | F | B |
| 80 | B | B | B | B | F |
| 100 | B | B | F | B | B |

DIESEL INTERNAL COMBUSTION ENGINE WITH SOOT BURN-OFF DEVICE

The invention is directed to self-igniting, air-compressing injection internal combustion engines with a soot filter in the exhaust gas system and a controllable soot burn-off device, and comprises a burner arranged in the soot filter and being operable with fresh air separately supplied to the soot filter. It is based on German Unexamined Laid-Open Application DOS No. 2,519,609.

The device for the controlled burn-off of soot filtered out of the exhaust gas suggested therein for a diesel engine is relatively expensive due to a large number of structural components.

Therefore, the invention renders a burn-off device in a self-igniting, air-compressing injection internal combustion engine usable for several purposes thereby increasing its cost-effectiveness ratio.

Starting with the state of the art as referred to above, the invention comprises a soot burn-off device operable for heating up the internal combustion engine and/or operating and running media of the internal combustion engine before or during operation of the internal combustion engine.

By the multipurpose exploitation provided by this invention for the soot burn-off device in a diesel engine, this device becomes more economical.

An internal combustion engine, as previously described, may have an exhaust gas return conduit which terminates in an intake system, wherein at least a portion of the intake air is conducted, during startup of the internal combustion engine, via the soot burn-off device and the exhaust gas return conduit so that the soot burn-off device acts as an intake air heater. The soot burn-off device thus can serve as an intake air heater in case of a cold startup of the diesel engine. This utilization according to the invention can be attained with low additional expenditure by employing an already present exhaust gas return conduit for feeding the hot gases produced in the soot burn-off device into the intake system of the internal combustion engine.

Furthermore, the soot burn-off device, with the diesel engine not being in operation, can be operated, according to this invention, for the production of hot gas which latter, for example at low ambient temperatures, is conducted through a heat exchanger arranged in the circulation system of a liquid operating medium. The heat exchanger is in communication with the exhaust gas system via a blockable bypass conduit, wherein the heat exchanger, before placing the internal combustion engine in operation, is traversed by the hot gases of the operating soot burn-off device for preheating a coolant of the internal combustion engine or the lubricating oil.

The aforedescribed versions for providing multipurpose usage of the soot burn-off device according to this invention can be simultaneously arranged on a diesel engine. For this purpose, a combined control mechanism is possible which, upon startup of the internal combustion engine, blocks the bypass conduit to the heat exchanger and opens the exhaust gas return conduit to the intake system. Further, the soot burn-off device, during operation of the diesel engine, is activated by way of the control mechanism in a conventional way in dependence on the exhaust gas counterpressure upstream of the soot filter.

It is therefore an object of the invention to produce an improved burn-off device.

It is another object of the invention to produce a burn-off device of increased cost-effectiveness.

It is another object of the invention to render the burn-off device in a self-igniting, air-compressing injection internal combustion engine usable for several purposes.

It is another object of the invention to produce a self-igniting, air-compressing injection internal combustion engine with a soot filter in the exhaust gas system and a controllable soot burn-off device, comprising a burner arranged in the soot filter and being operable with fresh air separately supplied to the soot filter, wherein the soot burn-off device is operable for heating up the internal combustion engine and/or operating and running media of the internal combustion engine before or during operation of the internal combustion engine.

It is another object of the invention to produce an internal combustion engine of the character described having an exhaust gas return conduit which terminates in an intake system, wherein at least a portion of the intake air is conducted, during startup of the internal combustion engine, via the soot burn-off device and the exhaust gas return conduit so that the soot burn-off device acts as an intake air heater.

It is another object of the invention to produce an internal combustion engine of the character described with a heat exchanger arranged in the circulation system of a liquid operating medium, which heat exchanger is in communication with the exhaust gas system via a blockable bypass conduit, wherein the heat exchanger, before placing the internal combustion engine in operation, is traversed by the hot gases of the operating soot burn-off device.

Figure 2:
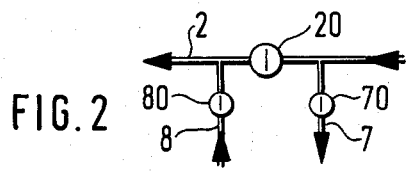
Figure 4:
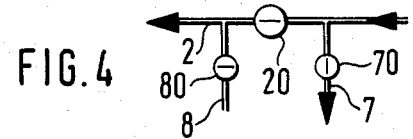
Figure 5:
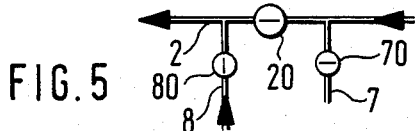
Figure 3:
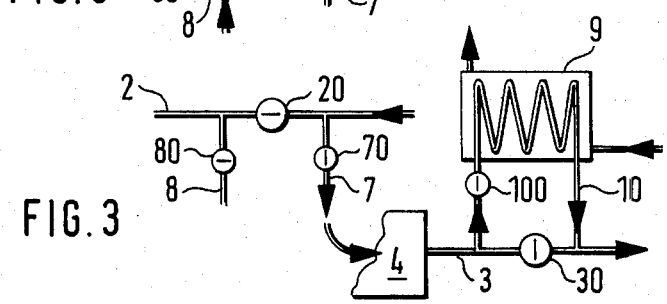

These and other objects, features, and advantages of the present invention will become more apparent from the following description when taken in connection with the accompanying drawings wherein like elements are represented by like reference numerals and which show, for the purposes of illustration only, one embodiment in accordance with the present invention, and wherein:

FIG. 1 shows a diesel internal combustion engine with soot filter and soot burn-off device with control elements set for normal operation, FIG. 2 shows the arrangement with control elements set for air intake heating operation, FIG. 3 shows the arrangement with control elements set for heat exchanger operation, FIG. 4 shows the arrangement with control elements set for burn-off operation, FIG. 5 shows the arrangement with control elements set for exhaust gas return operation.

Figures 6, 7:
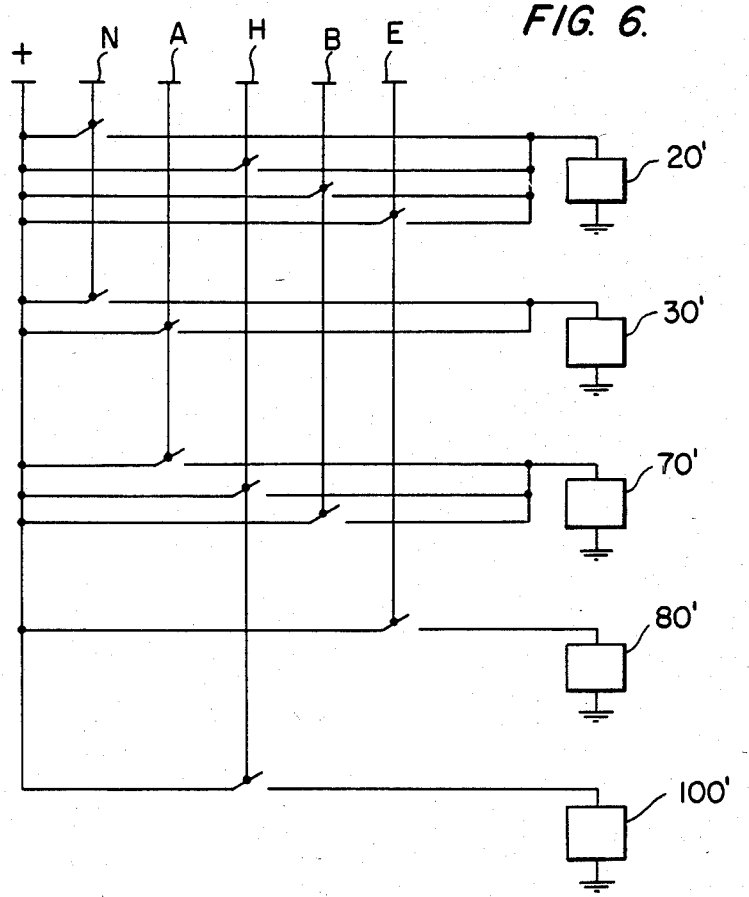

FIG. 6 shows a schematic diagram for flow control according to the invention, and FIG. 7 shows a truth table in accordance with the invention.

A diesel internal combustion engine denoted by 1 comprises an intake system 2 and an exhaust gas system 3. A soot filter 4 is arranged in the exhaust gas system 3. A soot burn-off device 5 comprises a burner 6 located in the soot filter 4 and a fresh air conduit 7. The latter is, on the one hand, in communication with the intake system 2, and on the other hand, terminates in the soot filter 4 in close proximity to the burner 6. Furthermore, a conduit 8 is connected to the soot filter 4 on the side of the burner and/or on the exhaust gas feed side; the other end of this conduit 8 terminates in the intake system 2. A control element 70 is arranged in the fresh air conduit 7, and a control element 80 is disposed in conduit 8. Further, the intake system 2 is equipped with a control element 20 between the fresh air conduit 7 and conduit 8.

Finally, a heat exchanger 9 is arranged in a circulation system, not shown, for a liquid operating medium, cooling water or lubricating oil, of the diesel engine 1. The heat exchanger 9 is in communication, downstream of the soot filter 4, with the exhaust gas system 3 by way of a bypass conduit 10. Between the connections of the bypass conduit 10 to the exhaust gas system 3, the latter is equipped with a control element 30. A control element 100 is located in the bypass conduit 10.

The soot burn-off device 5 can be actuated for heating operating media and running materials, such as intake air, cooling water, or lubricating oil, for the internal combustion engine 1 before or during its operation, by way of a device shown schematically in FIG. 6. This device also actuates all of the aforementioned control elements 20, 30, 70, 80 and 100.

During normal operation of the diesel engine 1 without soot burn-off in the soot filter 4, FIG. 1, the control element 20 in the intake system 2 and the control element 30 in the exhaust system 3 are set to free passage, as shown in FIG. 1. The control elements 70, 80 and 100 are set at blockage.

In order to heat up the intake air during startup of the diesel engine 1, FIG. 2, the soot burn-off device 5 is activated to ignite the burner 6, the control elements 70 and 80 of conduits 7 and 8 between the intake system 2 and the soot filter 4 are simultaneously set at free passage. The control element 20 is blocked. The intake air thus flows via the fresh air conduit 7 to the flame of the burner 6 in the soot filter 4. The hot gas, consisting of heated intake air and the exhaust gases of the burner 6 is supplied to the intake system 2 by way of conduit 8. The soot burn-off device 5 thus serves as an intake air heater.

In order to heat the cooling water or the lubricating oil in heat exchanger 9 prior to placing the diesel engine 1 in operation, FIG. 3, the soot burn-off device 5 is controlled so that it ignites the burner 6 while simultaneously the control element 70 is activated for free passage in the fresh air conduit 7, and the control element 80 in conduit 8 is activated to be blocked. Furthermore, control element 20 is free, the control element 30 in the exhaust system 3 is blocked, whereas the control element 100 in bypass conduit 10 to the heat exchanger 9 is set at free passage. Consequently, the heat exchanger 9 is traversed by the hot gases of the activated soot burn-off device 5.

If, during operation of the diesel engine 1, the soot burn-off device 5 is activated for soot burn-off in dependence on the exhaust gas counterpressure, FIG. 4, then the control element 70 of the fresh air conduit 7 is set at free passage, and the control element 80 of conduit 8 is set at blockage. Control element 20 is free.

If, finally, during operation of the diesel engine 1, exhaust gas recycling into the intake system 2 is provided, then, according to FIG. 5, control element 20 and control element 80 of conduit 8 are activated for free passage, and the control element 70 of the fresh air conduit 7 is set at blockage.

The relationship of the control elements in their open or free positions and their blocked positions can be considered to form a truth table as shown in FIG. 7. The control of the control element may be effected in a variety of ways known to those skilled in the art of which FIG. 6 is but a single exemplary form. In this Figure, elements 20', 30', 70', 80' and 100' may be considered as solenoid switches for opening and closing control elements 20, 30, 70, 80 and 100, respectively. In the figure, the control elements are presumed to be closed unless actuated by the solenoid to an opened position. Switch N, as shown in the figure, the switch for normal operation serves, upon depression to close switches to connect an electrical potential (+) to solenoids 20' and 30'. In a similar fashion for heating air intake, the switch A serves to actuate solenoids 30' and 70' and 80'. For heat exchange operation, the switch H energizes 20', 70' and 100'. For burn-off operation, switch B actuates 20', 30' and 70' while for exhaust gas recycling, switch E actuates 20', 30' and 80'. The switches are not mutually exclusive in their operation for it will be apparent that, if desired, a plurality of switches may be actuated simultaneously.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A self-igniting, air-compressing injection internal combustion engine, with an intake and an exhaust with a soot filter having a controllable soot-burning device comprising a burner, a fresh air line equipped with a first control element for supplying combustion air from the intake to the burner an exhaust return line means connected to the soot filter and controllable by a second control element for transmitting exhaust to the intake further comprising a third control element disposed in the intake downstream from the input to the fresh air line, the exhaust return line being connected to provide input to the intake downstream of the third control element, and control means for controlling the first, second and third control elements of the intake, the fresh air line, and the exhaust return line to actuate the soot-burning device as a flame starter when starting the internal combustion engine.

2. An internal combustion engine according to claim 1, wherein the control means controls the third control element on starting the internal combustion engine to effect heating of only a portion of the intake air in the soot-burning device that serves as a flame starter.

3. An internal combustion engine according to one of claims 1 or 2 further comprising a heat exchanger disposed in the circuit of a fluid operating medium, a bypass line communicating the heat exchanger with the exhaust, a fourth control element disposed in the bypass line a fifth control element disposed in the exhaust between an input and an output of the bypass line, wherein the control means additionally controls the fourth and fifth control elements to effect traversal of the heat exchanger by hot gases from the operating burning device before the internal combustion engine starts.

* * * * *